(12) United States Patent
Thomas et al.

(10) Patent No.: US 10,597,554 B2
(45) Date of Patent: Mar. 24, 2020

(54) PRIMER COATING COMPOSITION

(71) Applicant: PPG Industries Ohio, Inc., Cleveland, OH (US)

(72) Inventors: Stephen J. Thomas, Aspinwall, PA (US); Jun Deng, Murrysville, PA (US); Kimberly S. Kibler, Marion, OH (US); Jonathan T. Martz, Glenshaw, PA (US); Steven D. Schumacher, Delaware, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1007 days.

(21) Appl. No.: 14/254,920

(22) Filed: Apr. 17, 2014

(65) Prior Publication Data

US 2015/0299502 A1 Oct. 22, 2015

(51) Int. Cl.
| | | |
|---|---|---|
| *C09D 133/12* | (2006.01) | |
| *C09D 133/06* | (2006.01) | |
| *C09D 167/00* | (2006.01) | |
| *C08G 18/62* | (2006.01) | |
| *C08G 18/79* | (2006.01) | |

(Continued)

(52) U.S. Cl.
CPC ........ *C09D 133/12* (2013.01); *C08F 283/004* (2013.01); *C08G 18/4063* (2013.01); *C08G 18/4277* (2013.01); *C08G 18/6254* (2013.01); *C08G 18/792* (2013.01); *C09D 133/06* (2013.01); *C09D 167/00* (2013.01); *C09D 175/04* (2013.01); *C08F 2230/085* (2013.01)

(58) Field of Classification Search
CPC ... C09D 133/12; C09D 167/00; C09D 133/06
See application file for complete search history.

(56) References Cited

U.S. PATENT DOCUMENTS

| | | |
|---|---|---|
| 4,076,766 A | 2/1978 | Simms |
| 4,864,000 A | 9/1989 | Boston et al. |

(Continued)

FOREIGN PATENT DOCUMENTS

| | | | |
|---|---|---|---|
| CN | 1226279 A | 8/1999 | |
| DE | 19544737 C1 | 12/1996 | |
| WO | WO 2012020673 A1 * | 2/2012 | ............ C09J 133/08 |

OTHER PUBLICATIONS

Joncryl (R) 918-BASF-datasheet, Jun. 8, 2016.*

(Continued)

*Primary Examiner* — Nicole M. Buie-Hatcher
(74) *Attorney, Agent, or Firm* — Justin P. Martinchek

(57) ABSTRACT

The present invention relates to a primer coating composition that includes, (a) a (meth)acrylic polymer that includes hydroxyl groups, and which has a Tg of at least 30° C. The primer coating composition further includes, (b) a polyester that includes hydroxyl groups, and which has a weight average molecular weight of less than 3000, and a hydroxyl value of at least 100. The primer coating composition also includes, (c) a crosslinking agent having at least two isocyanate groups. The present invention also relates to a coated article that includes a repaired area that includes a primer coating formed from the primer coating composition of the present invention. The primer coating compositions, in accordance with some embodiments, provide reduced or minimal ringing defects.

22 Claims, 1 Drawing Sheet

(51) Int. Cl.
   *C09D 175/04* (2006.01)
   *C08G 18/40* (2006.01)
   *C08G 18/42* (2006.01)
   *C08F 283/00* (2006.01)
   *C08F 230/08* (2006.01)

(56) References Cited

U.S. PATENT DOCUMENTS

| | | | |
|---|---|---|---|
| 5,239,012 | A | 8/1993 | McEntire et al. |
| 5,286,782 | A | 2/1994 | Lamb et al. |
| 5,288,802 | A | 2/1994 | Walters et al. |
| 5,468,802 | A | 11/1995 | Wilt et al. |
| 5,869,566 | A | 2/1999 | Thomas |
| 6,120,851 | A | 9/2000 | Borgholte et al. |
| 6,458,885 | B1 * | 10/2002 | Stengel ............ C08G 18/6241 524/507 |
| 6,482,474 | B1 | 11/2002 | Fenn et al. |
| 7,381,472 | B2 | 6/2008 | Brandenburger et al. |
| 7,666,951 | B2 * | 2/2010 | Jennings ............ C09D 167/00 525/418 |
| 8,124,242 | B2 | 2/2012 | Brandenburger et al. |
| 8,231,970 | B2 | 7/2012 | Walters et al. |
| 8,329,013 | B2 | 12/2012 | Brouwer et al. |
| 2003/0158316 | A1 | 8/2003 | Vanier et al. |
| 2006/0018856 | A1 | 1/2006 | Bosman et al. |
| 2009/0062453 | A1 | 3/2009 | Foringer et al. |
| 2011/0052919 | A1 * | 3/2011 | Yokoyama ............ C08L 33/00 428/414 |
| 2013/0130024 | A1 * | 5/2013 | Yamaguchi ............ C09J 133/08 428/336 |
| 2015/0104653 | A1 | 4/2015 | Morita et al. |

OTHER PUBLICATIONS

Limin et al., "Formula Design of Modern Paints", Chemical Industry Press, 2001, pp. 40-41 (cited in Chinese Office Action).

Xuemin et al., "Coatings and Painting Technology", Chemical Industry Press, 2006, pp. 27 (cited in Chinese Office Action).

Liang Zengtian, edited, "Paints and coatings for plastics", Scientific and Technical Documents Publishing House, Mar. 2006, pp. 104.

Donald Campbell, "Calculation of Crosslink Density of Thermoset Polymers", Paint & Coatings Industry (PCI), Jun. 3, 2018.

* cited by examiner

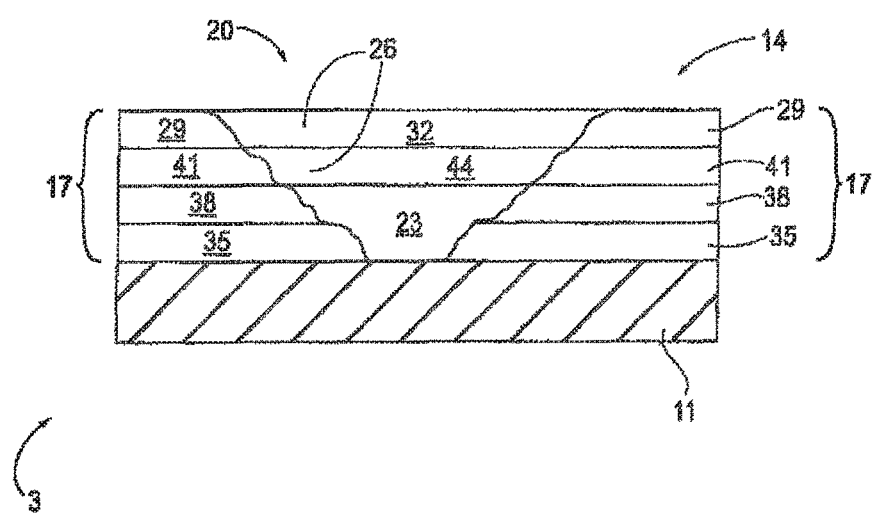

PRIMER COATING COMPOSITION

FIELD

The present invention relates to a primer coating composition that includes, a hydroxyl functional (meth)acrylic polymer having a Tg of at least 30° C., a hydroxyl functional polyester having a weight average molecular weight of less than 3000, and a hydroxyl value of at least 100, and a crosslinking agent having at least two isocyanate groups. With some embodiments, the primer coating composition is a refinish primer coating composition that is curable under ambient conditions, and which provides reduced or minimal ringing defects.

BACKGROUND

With some applications, such as vehicle coatings, multilayer coatings are applied and formed over the substrates thereof, which typically include metal substrates, such as a steel substrates. In some instances, such as with original equipment automotive coatings, the multilayer coatings include, in sequence from the steel substrate, an electrodeposited corrosion resistant layer (or electrocoat layer), a primer layer, a pigmented basecoat layer, and a clearcoat layer. During use, such as driving, such a multilayer coating can be damaged, such as by debris striking the multilayer coating at high velocity.

Repair of the damaged multilayer coating generally involves: sanding the damaged area at least down to or into the electrocoat layer with a series of sanding substrates (or sandpapers) having sequentially decreasing grit size; cleaning the sanded area with a solvent; applying a refinish primer over the sanded and cleaned area; allowing the applied refinish primer to dry; sanding the dried refinish primer layer; applying a refinish basecoat over the dried and sanded refinish primer layer; applying wet-on-wet a refinish clearcoat over the basecoat layer; and allowing the applied refinish layers to cure at ambient conditions for at least a sufficient amount of time, such as at least 8 hours. Typically, the refinish primer, refinish basecoat, and refinish clearcoat compositions and corresponding applied layers are each curable at ambient conditions. After the applied refinish coating layers have cured, a visually observable defect in the form of a ring sometimes appears along the edge of the area of the original sanding step (in which the damaged area was initially sanded). The visually observable defect typically becomes observable within at least one day, such as from 1 to 14 days after application of the refinish repair layers, and is sometimes referred to a "ringing defect" or an "edge mapping defect." The formation of ringing defects is believed, in some cases, to be due to the refinish primer.

The occurrence of such ringing defects generally requires that the repaired area be subjected to a subsequent repair sequence as described above, beginning with sanding the repaired area at least down to or into the electrocoat layer. Repeating the repair sequence can result in an undesirable increase in the labor and material costs associated with repairing a damaged multilayer coating.

It would be desirable to develop new primers, such as newly developed refinish primers, that provide reduced, minimal, or no ringing defects when used as part of a multilayer repair of a damaged multilayer coating. It would be further desirable that such newly develop primers provide other properties, such as, but not limited to, hardness, flexibility, and adhesion, that are at least as good as primers that do result in the formation of ringing defects.

SUMMARY

In accordance with the present invention, there is provided a primer coating composition comprising: (a) a (meth) acrylic polymer comprising hydroxyl groups, and having a Tg of at least 30° C.; (b) a polyester comprising hydroxyl groups, and having a weight average molecular weight of less than 3000, and a hydroxyl value of at least 100; and (c) a crosslinking agent having at least two isocyanate groups.

In accordance with the present invention, there is further provided a coated article comprising: (a) a substrate comprising a coated area comprising a first coating, and a repaired area, wherein the repaired area resides within the coated area; (b) a primer layer residing within the repaired area, wherein the primer layer is formed from the primer coating composition of the present invention, such as described in the preceding paragraph; and (c) at least one second coating residing over the primer layer, the first coating and the second coating being substantially flush with each other.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWING

The FIGURE is a representative sectional side elevational view of a coated article, according to some embodiments, that includes a repaired area that includes a primer coating formed from the primer coating composition of the present invention.

DETAILED DESCRIPTION

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about."

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

As used herein, the term "(meth)acrylic polymer" means a polymer prepared from one or more (meth)acrylate monomers, optionally (meth)acrylic acid monomers, and optionally one or more other ethylenically unsaturated radically polymerizable monomers, and which correspondingly include residues of one or more (meth)acrylate monomers (or one or more (meth)acrylate monomer units), optionally residues of (meth)acrylic acid monomers (or (meth)acrylic acid monomer units), and optionally residues of one or more other ethylenically unsaturated radically polymerizable monomers.

As used herein the term "Tg" means glass transition temperature.

As used herein, Tg values and ranges recited with regard to the (meth)acrylic polymer of the primer coating composition are determined in accordance with the Fox Equation.

As used herein, the term "high Tg (meth)acrylate monomer" means a (meth)acrylate monomer the homopolymer of which has a Tg of at least 40° C., as determined in accordance with the Fox equation.

As used herein, the term "oxirane" and related terms, such as "oxirane group" and "epoxy group" means the following moiety:

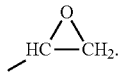

As used herein, the term "isocyanate" and related terms, such as "isocyanate group" means the following moiety: —N=C=O.

As used herein, the term "polyisocyanate" means a material having at least two isocyanate groups, such as, but not limited to, 2, 3, 4, 5, 6, 7, 8, 9, or 10 isocyanate groups.

As used herein, the term "aliphatic" and related terms, such as "aliphatic group" and "aliphatic polymer," means a material that is free of aromatic groups.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include: a methylene group or a methyl group; groups that are linear, such as linear $C_2$-$C_{20}$ alkyl groups; and groups that are appropriately branched, such as branched $C_3$-$C_{20}$ alkyl groups.

The term "alkyl" as used herein, in accordance with some embodiments, means linear or branched alkyl, such as but not limited to, linear or branched $C_1$-$C_{25}$ alkyl, or linear or branched $C_1$-$C_{10}$ alkyl, or linear or branched $C_2$-$C_{10}$ alkyl. Examples of alkyl groups from which the various alkyl groups of the present invention can be selected from, include, but are not limited to, methyl, ethyl, propyl, isopropyl, butyl, isobutyl, sec-butyl, tert-butyl, pentyl, neopentyl, hexyl, heptyl, octyl, nonyl and decyl. Alkyl groups of the various compounds and/or components of the present invention can, with some embodiments, include one or more unsaturated linkages selected from —CH=CH— groups and/or one or more —C≡C— groups. With some embodiments, the alkyl groups are free of two or more conjugated unsaturated linkages. With some embodiments, the alkyl groups are free of unsaturated linkages, such as —CH=CH— groups and —C≡C— groups.

The term "cycloalkyl" as used herein, in accordance with some embodiments, means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include, but are not limited to, cyclopropyl, cyclobutyl, cyclopentyl, cyclohexyl, and cyclooctyl. The term "cycloalkyl" as used herein in accordance with some embodiments also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein, in accordance with some embodiments, means groups that are appropriately cyclic, such as but not limited to, $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, imidazolyl, tetrahydrofuranyl, tetrahydropyranyl, and piperidinyl. The term "heterocycloalkyl" as used herein, in accordance with some embodiments, also includes: bridged ring polycyclic heterocycloalkyl groups, such as but not limited to, 7-oxabicyclo[2.2.1]heptanyl; and fused ring polycyclic heterocycloalkyl groups, such as but not limited to, octahydrocyclopenta[b]pyranyl, and octahydro-1H-isochromenyl.

The term "aryl," as used herein, in accordance with some embodiments, includes but is not limited to $C_5$-$C_{15}$ aryl, such as but not limited to $C_5$-$C_{10}$ aryl (including fused ring polycyclic aryl groups). Examples of heteroaryl groups include, but are not limited to, phenyl, naphthylanthracynyl, and triptycenyl.

The term "heteroaryl," as used herein, in accordance with some embodiments, includes but is not limited to $C_5$-$C_{18}$ heteroaryl, such as but not limited to $C_5$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, furanyl, pyranyl, pyridinyl, isoqunoline, and pyrimidinyl.

As used herein, the term "fused ring polycyclic-aryl-alkyl group" and similar terms such as, fused ring polycyclic-alkyl-aryl group, fused ring polycyclo-aryl-alkyl group, and fused ring polycyclo-alkyl-aryl group means a fused ring polycyclic group that includes at least one aryl ring and at least one cycloalkyl ring that are fused together to form a fused ring structure. For purposes of non-limiting illustration, examples of fused ring polycyclic-aryl-alkyl groups include, but are not limited to indenyl, 9H-flourenyl, cyclopentanaphthenyl, and indacenyl.

The term "aralkyl," as used herein, and in accordance with some embodiments, includes but is not limited to $C_6$-$C_{24}$ aralkyl, such as but not limited to $C_8$-$C_{10}$ aralkyl, and means an aryl group substituted with an alkyl group. Examples of aralkyl groups include, but are not limited to, benzyl, and phenethyl.

The primer compositions of the present invention include a (meth)acrylic polymer that includes hydroxyl groups, and which has a Tg of at least 30° C. The (meth)acrylic polymer is provided with hydroxyl functionality, with some embodiments, by: (i) preparing the (meth)acrylic polymer using hydroxyl functional ethylenically unsaturated radically polymerizable monomers, such as hydroxyl functional (meth)acrylate monomers and/or hydroxyl functional allylic monomers (such as, but not limited to, (meth)allyl alcohol); and/or (ii) introducing hydroxyl groups into the (meth) acrylic polymer after it has been formed, in accordance with art-recognized methods. For purposes of non-limiting illustration, and in accordance with some embodiments, the (meth)acrylic polymer can be prepared using hydroxyl functional (meth)acrylate monomers, such as hydroxyalkyl (meth)acrylate monomers, in which the hydroxyl group has been previously converted to a carboxylic acid ester group. After formation of an intermediate (meth)acrylic polymer, the carboxylic acid ester groups (or blocking groups) can be removed in accordance with art-recognized methods, thus converting the intermediate (meth)acrylic polymer into a (meth)acrylic polymer having hydroxyl groups.

Hydroxyl functional (meth)acrylate monomers that can be used to prepared the (meth)acrylic polymer of the primer composition of the present invention include, but are not limited to, those represented by the following formula (I):

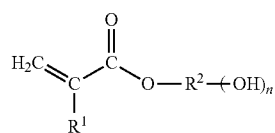

(I)

With reference to Formula (I), and in accordance with some embodiments: $R^1$ is hydrogen or methyl; $R^2$ is selected from divalent alkyl, divalent cycloalkyl, divalent heterocycloalkyl, divalent aryl, divalent heteroaryl, and divalent fused ring polycyclic-aryl-alkyl; and n is from 1 to 10, or from 1 to 5, or from 1 to 3, or from 1 to 2, inclusive of the recited values. With some embodiments, subscript n of Formula (I) is 1.

With further reference to Formula (I), and in accordance with some further embodiments, $R^2$ is selected from divalent linear or branched $C_1$-$C_{25}$ alkyl, or divalent linear or branched $C_1$-$C_{10}$ alkyl, or divalent linear or branched $C_2$-$C_{10}$ alkyl, or divalent $C_3$-$C_{12}$ cycloalkyl, or divalent $C_5$-$C_7$ cycloalkyl. Examples of hydroxyl functional (meth)acrylate monomers that can be used to prepare the (meth)acrylic polymer of the primer composition of the present invention include, but are not limited to, hydroxyethyl (meth)acrylate, hydroxypropyl (meth)acrylate, hydroxybutyl (meth)acrylate, and hydroxycycloalkyl (meth)acrylate.

In accordance with some further embodiments, the (meth) acrylic polymer is prepared from one or more oxirane functional ethylenically unsaturated radically polymerizable monomers, in which the oxirane group is ring-opened in accordance with art-recognized methods during and/or after polymerization, so as to provide the (meth)acrylic polymer with hydroxyl functionality. With some embodiments, prior to polymerization, the oxirane functional ethylenically unsaturated radically polymerizable monomer is subjected to art-recognized ring-opening to form a hydroxyl functional ethylenically unsaturated radically polymerizable monomer from which the (meth)acrylic polymer is prepared. Examples of oxirane functional ethylenically unsaturated radically polymerizable monomers that can be used, with some embodiments, in the preparation of the (meth)acrylic polymer include, but are not limited to, glycidyl (meth) acrylate, 3,4-epoxycyclohexylmethyl (meth)acrylate, 2-(3, 4-epoxycyclohexyl)ethyl (meth)acrylate and allyl glycidyl ether.

The (meth)acrylic polymer, with some embodiments, has a hydroxyl value of at least 15, or at least 20, or at least 25, or at least 30. The (meth)acrylic polymer, with some embodiments, has a hydroxyl value of less than or equal to 100, or less than or equal to 90, or less than or equal to 80, or less than or equal to 75. The hydroxyl value of the (meth)acrylic polymer can, with some embodiments, range between any combination of these upper and lower values, inclusive of the recited values, such as from 15 to 100, or from 20 to 90, or from 25 to 80, or from 30 to 75. The hydroxyl value of the (meth)acrylic polymer, with some embodiments, is determined in accordance with ASTM E222-10 Standard Test Method for hydroxyl groups using acetic anhydride acetylation, available from ASTM International.

The (meth)acrylic polymer of the primer composition, can be prepared by art-recognized methods, such as, but not limited to, free radical polymerization methods, and living radical polymerization methods, such as atom transfer radical polymerization methods and/or electron transfer radical polymerization methods, in each case using appropriate initiators, catalysts, and molecular weight control agents, in appropriate amounts, as the case may be.

The (meth)acrylic polymer, with some embodiments, has a weight average molecular weight (Mw) of at least 5,000, or at least 6,000, or at least 7,000. The (meth)acrylic polymer, with some embodiments, has a weight average molecular weight (Mw) of less than or equal to 25,000, or less than or equal to 20,000, or less than or equal to 15,000. The weight average molecular weight of the (meth)acrylic polymer can, with some embodiments, range between any combination of these upper and lower values, inclusive of the recited values, such as from 5,000 to 25,000, or from 6,000 to 20,000, or from 7,000 to 15,000.

In accordance with some embodiments, the (meth)acrylic polymer of the primer composition has a hydroxyl value of from 15 to 100, and a weight average molecular weight of from 5,000 to 25,000.

The (meth)acrylic polymer of the primer composition, with some embodiments, has a Tg of at least 30° C. or at least 40° C. In accordance with some further embodiments, the (meth)acrylic polymer has a Tg of less than or equal to 100° C., or less than or equal to 90° C. The Tg of the (meth)acrylic polymer can, with some embodiments, range between any combination of these upper and lower values, inclusive of the recited values, such as from 30° C. to 100° C., or from 40° C. to 90° C.

In addition to including residues of one or more hydroxyl functional ethylenically unsaturated radically polymerizable monomers, the (meth)acrylic polymer further includes, with some embodiments, residues of one or more high Tg (meth) acrylate monomers, which each independently have a Tg of at least 40° C., or at least 90° C. With some further embodiments, each high Tg (meth)acrylate monomer independently has a Tg of less than or equal to 100° C., or less than or equal to 90° C. The Tg of each high Tg (meth) acrylate monomer can, with some embodiments, range between any combination of these upper and lower values, including the recited values, such as from 30° C. to 100° C., or from 40° C. to 90° C. The high Tg (meth)acrylate monomers, with some embodiments, are free of active hydrogen functionality, such as, but not limited to, hydroxyl groups, thiol groups, primary amine groups, secondary amine groups, and carboxylic acid groups.

The (meth)acrylic polymer of the primer composition includes, with some additional embodiments, one or more high Tg (meth)acrylate monomers chosen from methyl methacrylate, ethyl methacrylate, iso-butyl methacrylate, sec-butyl methacrylate, t-butyl acrylate, t-butyl methacrylate, cyclohexyl methacrylate, isobornyl acrylate, isobornyl methacrylate, tetramethyl cyclohexyl methacrylate, and combinations of two or more thereof.

In accordance with some embodiments, the (meth)acrylic polymer of the primer composition optionally further includes residues of ethylencially unsaturated radically polymerizable monomers that are other than: (i) the hydroxyl functional ethylencially unsaturated radically polymerizable monomer(s); and (ii) the high Tg (meth)acrylate monomer(s). Examples of such optional ethylencially unsaturated radically polymerizable monomers include, but are not limited to: (meth)acrylic acid; (meth)acrylate monomers that are other than the high Tg (meth)acrylate monomers as described and recited previously herein; vinyl aromatic monomers; vinyl halide monomers; vinyl esters of carboxylic acids; olefins; allylic monomers; cyclic anhydrides; esters of acids that are unsaturated but do not have alpha/beta-ethylenic unsaturation; and diesters of ethylenically unsaturated dibasic acids.

Examples of optional (meth)acrylate monomers from which the (meth)acrylate polymer can be prepared, with some embodiments, include, but are not limited to, methyl acrylate, ethyl acrylate, n-butyl methacrylate, 2-ethylhexyl acrylate, and isooctyl acrylate.

Examples of optional vinyl aromatic monomers from which the (meth)acrylic polymer can be prepared, with some embodiments, include, but are not limited to, styrene, p-chloromethylstyrene, divinyl benzene, vinyl naphthalene and divinyl naphthalene. Examples of optional vinyl halide monomers from which the (meth)acrylic polymer can be prepared, with some embodiments, include, but are not limited to, vinyl chloride and vinylidene fluoride. Examples of optional vinyl esters of carboxylic acids that can be used to prepare the (meth)acrylic polymer include, but are not limited to, vinyl acetate, vinyl butyrate, vinyl 3,4-dimethoxybenzoate and vinyl benzoate.

As used herein, by "olefin" and like terms is meant unsaturated aliphatic hydrocarbons having one or more double bonds, such as obtained by cracking petroleum fractions. Examples of optional olefins that can be used to prepare the (meth)acrylic polymers include, but are not limited to, propylene, 1-butene, 1,3-butadiene, isobutylene and diisobutylene.

As used herein, by "allylic monomer(s)" is meant monomers containing substituted and/or unsubstituted allylic functionality, such as one or more radicals represented by the following Formula (II),

$$H_2C=C(R_a)-CH_2-\qquad (II)$$

With reference to Formula (II), $R_a$ is hydrogen, halogen or a $C_1$ to $C_4$ alkyl group. With some embodiments, $R_a$ is hydrogen or methyl and consequently Formula (II) represents an unsubstituted (meth)allyl radical. Examples of optional allylic monomers that can be used to prepare the (meth)acrylic polymer include, but are not limited to: (meth)allyl ethers, such as methyl (meth)allyl ether; allyl esters of carboxylic acids, such as (meth)allyl acetate, (meth)allyl butyrate, (meth)allyl 3,4-dimethoxybenzoate, and (meth)allyl benzoate.

Examples of optional cyclic anhydrides that can be used to prepare the (meth)acrylic polymer include, but are not limited to, maleic anhydride, 1-cyclopentene-1,2-dicarboxylic anhydride and itaconic anhydride. Examples of optional esters of acids that are unsaturated but do not have alpha/beta-ethylenic unsaturation, that can be used to prepare the (meth)acrylic polymer include, but are not limited to, the methyl ester of undecylenic acid and the methyl ester of decylenic acid. Examples of optional diesters of ethylenically unsaturated dibasic acids that can be used to prepare the (meth)acrylic polymer include, but are not limited to, diethyl maleate and dibutyl maleate.

The optional ethylencially unsaturated radically polymerizable monomers can, with some embodiments, be present in the monomers from which the (meth)acrylic polymer is prepared in an amount of at least 0.1 percent by weight, or at least 0.5 percent by weight, or at least 1 percent by weight. The optional ethylencially unsaturated radically polymerizable monomers can, with some further embodiments, be present in the monomers from which the (meth)acrylic polymer is prepared in an amount of less than or equal to 35 percent by weight, or less than or equal to 30 percent by weight, or less than or equal to 25 percent by weight. The percent weights, in each case, are based on the total weight of monomers from which the (meth)acrylic polymer is prepared. The optional ethylencially unsaturated radically polymerizable monomers can, with some additional embodiments, be present in the monomers from which the (meth)acrylic polymer is prepared in amounts ranging between any combination of these recited upper and lower values, inclusive of the recited thresholds, such as from 0.1 to 35 percent by weight, or from 0.5 to 30 percent by weight, or from 1 to 25 percent by weight, in which the percent weights are based on the total weight of monomers from which the (meth)acrylic polymer is prepared.

With some embodiments, the (meth)acrylic polymer is not prepared from, and correspondingly is free of residues of, optional ethylencially unsaturated radically polymerizable monomers, such as: (meth)acrylic acid; (meth)acrylate monomers that are other than the high Tg (meth)acrylate monomers as described and recited previously herein; vinyl aromatic monomers; vinyl halide monomers; vinyl esters of carboxylic acids; olefins; allylic monomers; cyclic anhydrides; esters of acids that are unsaturated but do not have alpha/beta-ethylenic unsaturation; and diesters of ethylenically unsaturated dibasic acids.

In accordance with some embodiments, the (meth)acrylic polymer is substantially free of aromatic groups. The (meth)acrylic polymer, with some embodiments, includes less than 0.1 percent by weight, or less than 0.05 percent by weight, or less than 0.01 percent by weight of aromatic groups, in which the percent weights are based on the total weight of the monomers from which the (meth)acrylic polymer is prepared. With some embodiments, the (meth)acrylic polymer is free of (and does not include) aromatic groups. In accordance with some further embodiments, the (meth)acrylic polymer is prepared from monomers that are free of aromatic groups, and is not modified after formation so as to include aromatic groups.

The primer coating compositions of the present invention include a polyester having hydroxyl groups, a weight average molecular weight of less than 3000, and a hydroxyl value of at least 100. The polyesters of the primer coating compositions of the present invention include, with some embodiments, carboxylic acid ester linkages in the backbone, and terminal hydroxyl groups and/or pendent hydroxyl groups.

Polyesters, that are included in the primer compositions of the present invention, can be prepared by art-recognized methods. With some embodiments, the polyesters of the primer coating compositions of the present invention are prepared by reacting carboxylic acids (or their anhydrides, or their esters) having effective acid functionalities of at least 2, and polyols having hydroxy functionalities of at least 2. The molar equivalents ratio of carboxylic acid groups to hydroxy groups of the reactants is selected such that the resulting polyester has hydroxyl functionality, and a desired molecular weight. Polyesters, that are included in the primer compositions of the present invention, can be prepared by further art-recognized methods, which include, with some embodiments, reacting cyclic carboxylic acid esters and polyols having hydroxy functionalities of at least 2.

Examples of multifunctional carboxylic acids useful in preparing polyesters of the primer compositions of the present invention, include, but are not limited to, benzene-1,2,4-tricarboxylic acid, phthalic acid, tetrahydrophthalic acid, hexahydrophthalic acid, endobicyclo-2,2,1,5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, adipic acid, sebacic acid, and like multifunctional carboxylic acids.

Examples of polyols useful in preparing polyesters of the primer compositions of the present invention, include, but are not limited to, glycerin, trimethylolpropane, bis-trimethylolpropane, trimethylolethane, bis-trimethylolethane, tris-hydroxyethylisocyanurate, pentaerythritol, bis-pentaerythritol, ethylene glycol, propylene glycol, trimethylene glycol, 1,3-, 1,2- and 1,4-butanediols, heptanediol, hexanediol, octanediol, 2,2-bis(4-cyclohexanol)propane, neopentyl glycol, 2,2,3-trimethylpentane-1,3-diol, 1,4-dimethylolcyclohexane, 2,2,4-trimethylpentane diol, and like polyols.

The polyesters of the primer coating compositions of the present invention have, with some embodiments, a weight average molecular weight of at least 500, or at least 600, or at least 800. The polyesters of the primer coating compositions of the present invention have, with some further embodiments, a weight average molecular weight of less than 3000, or less than or equal to 2500, or less than or equal to 2000. With some embodiments, the polyesters of the primer coating compositions of the present invention can have a weight average molecular weight that ranges between any combination of these upper and lower values, such as from 500 to less than 3000, or from 600 to 2500, or from 800 to 2000.

The polyesters of the primer coating compositions of the present invention have, with some embodiments, a hydroxyl value of at least 100, or at least 110, or at least 120. The polyesters of the primer coating compositions of the present invention have, with some further embodiments, a hydroxyl value of less than or equal to 300, or less than or equal to 280, or less than or equal to 250. In accordance with some embodiments, the polyesters of the primer coating compositions of the present invention can have a hydroxyl value within any combination of these upper and lower values, inclusive of the recited values, such as from 100 to 300, or from 110 to 280, or from 120 to 250.

In accordance with some embodiments, the polyester of the primer coating compositions of the present invention has a weight average molecular weight of from 500 to less than 3,000, and a hydroxyl value of from 100 to 300. In accordance with some further embodiments, the polyester of the primer coating compositions of the present invention has a weight average molecular weight of from 800 to 2,000, and a hydroxyl value of from 120 to 250.

The polyester of the primer coating compositions of the present invention, with some embodiments, is an aliphatic polyester. The aliphatic polyesters of the primer coating compositions of the present invention are free of aromatic groups, and with some embodiments can optionally include carbon-carbon double bonds and/or carbon-carbon triple bonds. The aliphatic polyesters of the primer coating compositions of the present invention, with some embodiments, are prepared from monomers that are free of aromatic groups, and are not modified after formation so as to include aromatic groups.

The polyester of the primer coating compositions of the present invention, with some embodiments, is an aliphatic polyester and includes residues of at least one polyol having at least two hydroxyl groups, such as, at least one aliphatic polyol having at least two hydroxyl groups. Examples of aliphatic polyols having at least two hydroxyl groups, from which the polyester can be prepared, include, but are not limited to, glycerin, trimethylolpropane, bis-trimethylolpropane, trimethylolethane, bis-trimethylolethane, trishydroxyethylisocyanurate, pentaerythritol, bis-pentaerythritol, ethylene glycol, propylene glycol, trimethylene glycol, 1,3-, 1,2- and 1,4-butanediols, heptanediol, hexanediol, octanediol, 2,2-bis(4-cyclohexanol)propane, neopentyl glycol, 2,2,3-trimethylpentane-1,3-diol, 1,4-dimethylolcyclohexane, and 2,2,4-trimethylpentane diol.

In accordance with some embodiments, the polyester of the primer coating compositions of the present invention is an aliphatic polyester and each polyol residue thereof has at least three hydroxyl groups. In accordance with some further embodiments, the polyester of the primer coating compositions of the present invention is an aliphatic polyester and each polyol residue thereof is an aliphatic polyol residue having at least three hydroxyl groups. Examples of aliphatic polyols having at least three hydroxyl groups, from which the polyester can be prepared, include, but are not limited to, glycerin, trimethylolpropane, bis-trimethylolpropane, trimethylolethane, bis-trimethylolethane, trishydroxyethylisocyanurate, pentaerythritol, and bis-pentaerythritol.

The polyester of the primer coating compositions of the present invention, with some embodiments, includes residues of at last one cyclic carboxylic acid ester. The polyester of the primer coating compositions of the present invention, with some embodiments, is an aliphatic polyester and includes residues of at least one cyclic carboxylic acid ester, such as at least one aliphatic cyclic carboxylic acid ester.

With some embodiments, cyclic carboxylic acid esters from which polyester of the primer coating compositions of the present invention can be prepared, can be represented by the following Formula (III):

With reference to Formula (III), and in accordance with some embodiments, $R^3$ is selected from divalent linear or branched $C_2$-$C_{20}$ alkyl, or divalent linear or branched $C_2$-$C_{10}$ alkyl, or divalent linear or branched $C_2$-$C_5$ alkyl, which can each optionally include at least one substituent selected from, hydroxyl, thiol, and halogen (such as, F, Cl, Br, and I).

The polyester of the primer coating compositions of the present invention, with some embodiments, is an aliphatic polyester, and is prepared from (and correspondingly includes at least one residue of) a cyclic carboxylic acid ester, in which the cyclic carboxylic acid ester is selected from epsilon-caprolactone, delta-valerolactone, and combinations thereof.

The polyester of the primer coating compositions of the present invention, with some embodiments, includes residues of at least one polyol having three hydroxyl groups, and residues of at least one cyclic carboxylic acid ester. The polyester of the primer coating compositions of the present invention, with some further embodiments, consists essentially of, residues of at least one polyol having three hydroxyl groups, and residues of at least one cyclic carboxylic acid ester. The polyester of the primer coating compositions of the present invention, with some additional embodiments, is an aliphatic polyester and consists essentially of, residues of at least one aliphatic polyol having three hydroxyl groups, and residues of at least one aliphatic cyclic carboxylic acid ester. The polyester of the primer coating compositions of the present invention, with some additional further embodiments, is an aliphatic polyester and consists essentially of, residues of at least one aliphatic polyol having three hydroxyl groups, and residues of at least one aliphatic cyclic carboxylic acid ester, and contains less than 1 percent by weight, or less than 0.5 percent by weight, or less than 0.1 percent by weight, or less than 0.01 percent by weight, based on total weight of the aliphatic polyester, of residues that are other than (i) residues of at least one aliphatic polyol having three hydroxyl groups, and (ii) residues of at least one aliphatic cyclic carboxylic acid ester. In accordance with some further embodiments, the polyester of the primer coating compositions of the present invention, is an aliphatic polyester and consists of, residues of at least one aliphatic polyol having three hydroxyl groups, and residues of at least one aliphatic cyclic carboxylic acid ester, and is free of residues that are other than (i) residues of at least one aliphatic polyol having three hydroxyl groups, and (ii) residues of at least one aliphatic cyclic carboxylic acid ester.

The primer coating compositions of the present invention further include at least one crosslinking agent having at least two isocyanate groups. The crosslinking agent, with some embodiments, can be selected from: aliphatic polyisocyanates; aromatic polyisocyanates; cycloaliphatic polyisocyanates; heterocyclic polyisocyanates; adducts thereof, such as isocyanurates thereof and/or biurets thereof; and mixtures of thereof. Examples of polyisocyanates from which the crosslinking agent can be selected, include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; adducts of one or more thereof, such as isocyanurates and/or biurets of one or more thereof; and mixtures thereof.

In accordance with some embodiments of the present invention, the crosslinking agent includes an aliphatic crosslinking agent. In accordance with some further embodiments, the aliphatic crosslinking agent is chosen from: one or more aliphatic polyisocyanates; adducts of one or more aliphatic polyisocyanates, such as isocyanurates of one or more aliphatic polyisocyanates and/or biurets of one or more aliphatic polyisocyanates; and mixtures or combinations thereof. Examples of aliphatic polyisocyanates from which the crosslinking agent can be chosen, with some embodiments, include, but are not limited to, tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; adducts of one or more thereof, such as isocyanurates of one or more thereof and/or biurets of one or more thereof; and mixtures and/or combinations thereof.

The crosslinking agent of the primer coating compositions includes, with some embodiments, at least one isocyanurate adduct of at least one aliphatic diisocyanate. The aliphatic diisocyanates, of the isocyanurate adducts, can be chosen from one or more of those aliphatic diisocyanates recited previously herein. With some embodiments, aliphatic diisocyanates, of the isocyanurate adducts, can be chosen from 1,4-tetramethylene diisocyanate, 1,6-hexamethylene diisocyanate, 1,4-cyclohexyl diisocyanate, isophorone diisocyanate, 4,4'-methylene-bis(cyclohexyl isocyanate), and combinations thereof.

The (meth)acrylic polymer, with some embodiments, is present in the primer coating composition in an amount of at least 50 percent by weight, or at least 55 percent by weight, or at least 60 percent by weight, in which the percent weights are based on solids weight of the (meth)acrylic polymer and solids weight of the polyester. The (meth)acrylic polymer, with some further embodiments, is present in the primer coating composition in an amount of less than or equal to 96 percent by weight, or less than or equal to 90 percent by weight, or less than or equal to 85 percent by weight, in which the percent weights are based on solids weight of the (meth)acrylic polymer and solids weight of the polyester. In accordance with some embodiments, the (meth)acrylic polymer can be present in the primer coating composition in an amount ranging between any combination of these upper and lower values, inclusive of the recited values, such as from 50 percent by weight to 96 percent by weight, or from 55 percent by weight to 90 percent by weight, or from 60 percent by weight to 85 percent by weight, in which the percent weights are based on solids weight of the (meth)acrylic polymer and solids weight of the polyester.

The polyester, with some embodiments, is present in the primer coating composition in an amount of at least 4 percent by weight, or at least 10 percent by weight, or at least 15 percent by weight, in which the percent weights are based on solids weight of the (meth)acrylic polymer and solids weight of the polyester. The polyester, with some further embodiments, is present in the primer coating composition in an amount of less than or equal to 50 percent by weight, or less than or equal to 45 percent by weight, or less than or equal to 40 percent by weight. In accordance with some embodiments, the polyester can be present in the primer coating composition in an amount ranging between any combination of these upper and lower values, inclusive of the recited values, such as from 4 percent by weight to 50 percent by weight, or from 10 percent by weight to 45 percent by weight, or from 15 percent by weight to 40 percent by weight, in which the percent weights are based on solids weight of the (meth)acrylic polymer and solids weight of the polyester.

In accordance with some embodiments of the primer coating composition of the present invention: the (meth) acrylic polymer is present in the primer composition in an amount of from 50 percent by weight to 96 percent by weight, based on solids weight of the (meth)acrylic polymer and the polyester; and the polyester is present in the primer composition in an amount of from 4 percent by weight to 50 percent by weight, based on solids weight of the (meth) acrylic polymer and the polyester.

The amount, such as weight, of the crosslinking agent that is present in the primer coating composition of the present invention is selected, with some embodiments, such that the primer coating composition has a desired equivalent ratio of isocyanate groups to hydroxyl groups, in which the hydroxyl groups are provided by at least (a) the hydroxyl functional (meth)acrylic polymer and (b) the hydroxyl functional polyester. With some embodiments, the primer coating composition has an equivalent ratio of isocyanate groups to hydroxyl groups of from 0.5:1 to 1.8:1. With some further embodiments, the primer coating composition has an equivalent ratio of isocyanate groups to hydroxyl groups of from 0.6:1 to 1.6:1. With some additional embodiments, the primer coating composition has an equivalent ratio of isocyanate groups to hydroxyl groups of from 0.8:1 to 1.3:1.

The primer coating compositions of the present invention, with some embodiments, include at least one pigment. Examples of pigments that can be present in the primer composition include, but are not limited to: inorganic pigments, such as titanium dioxide and iron oxides; organic pigments, such as phthalocyanines, anthraquinones, quinacridones and thioindigos; and carbon blacks.

In addition to or alternatively to one or more pigments, the primer coating compositions of the present invention can, with some embodiments, include one or more fillers. Examples of fillers that can be present in the primer composition include, but are not limited to: silica, such as precipitated silicas; clay; mica; dolomite; talc; zinc borate; magnesium carbonate; calcium oxide; calcium carbonate; calcium silicate; calcium metasilicate; and/or barium sulfate. With some embodiments, the filler is or includes a fibrous filler, such as milled glass fibers and/or milled carbon fibers.

When used in the primer coating composition of the present invention, pigments and/or fillers can, with some embodiments, be present in amounts totaling from 0.1 percent to 70 percent by weight, based on the total solids weight of the curable composition.

The primer coating compositions, with some embodiments have a resin solids of from 50 percent by weight to 90 percent by weight, as determined at 110° C. for one hour. The resin solids of the primer composition includes, but is not limited to, (a) the (meth)acrylic polymer, (b) the polyester, and (c) the crosslinking agent as described previously herein.

The primer coating compositions further include, with some embodiments, one or more solvents, such as organic solvents. The solvent(s) are present, with some embodiments, so as to facilitate formulation and/or application of the primer coating compositions.

Examples of solvents that can be included in the primer compositions of the present invention include, but are not limited to: aliphatic solvents such as VM & P NAPTHA; aromatic petroleum distillates; cycloaliphatic solvents, such as cyclohexane; ketones, such as methylethyl ketone, methylisobutyl ketone and methyl amyl ketone; alcohols, such as ethyl alcohol, propyl alcohol and diacetone alcohol; acetates, such as butyl acetate and hexyl acetate; mono and dialkyl ethers of ethylene, propylene and diethylene glycols, such as ethylene glycol monethylether, ethylene glycol monobutyl ether, diethylene glycol diethyl ether, propylene glycol monomethyl ether, and dipropylene glycol ether; and monoalkyl ethers of monoester glycols, such as ethylene glycol monoethylether acetate and propylene glycol monomethyl ether acetate. With some embodiments, the primer compositions of the present invention include one or more solvents in an amount of 10 percent by weight to 90 percent by weight, based on the total weight of the primer coating composition.

The primer coating composition can, with some embodiments, include one or more additives. Classes of additives that can be included in the primer coating compositions of the present invention include, but are not limited to, surfactants, antioxidants, ultraviolet light absorbers, stabilizers, rheology control agents, and coalescing agents. Examples of antioxidants and UV light absorbers include, but are not limited to, those available commercially from BASF under the trademarks IRGANOX and TINUVIN. Examples of thixotropes include, but are not limited to, fumed silica, bentonite, stearic acid-coated calcium carbonate, polyamide, and fatty acid/oil derivatives. These optional additives, when used, can be present in amounts up to 20 percent by weight, based on total weight of the primer coating composition.

The primer coating compositions of the present invention, with some embodiments, are provided in the form of multi-package compositions that are combined together to form the primer coating composition, before (such as shortly before) application thereof. With some embodiments, the hydroxyl functional (meth)acrylic polymer and the hydroxyl functional polyester are in a first package, and the crosslinking agent is in a second package. With some further embodiments, the hydroxyl functional (meth)acrylic polymer and the hydroxyl functional polyester are in a first package, the crosslinking agent is in a second package, and one or more solvents are provided in a third package that can, with some embodiments optionally further include (i) one or more accelerators and/or (ii) one or more pot-life-extending materials. The three packages are combined together to form the primer coating composition prior to application thereof, such as on a substrate, with some embodiments. The accelerator, with some embodiments, increases the rate of reaction between the hydroxyl groups of the (meth)acrylic polymer and the polyester, and the isocyanate groups of the crosslinking agent. Examples of accelerators include, but are not limited to: stannous salts of one or more organic acids, such as (but are not limited to), stannous octoate, dibutyl tin dilaurate, dibutyl tin diacetate, dibutyl tin mercaptide, dibutyl tin dimaleate, dimethyl tin diacetate, and dimethyl tin dilaurate; and tertiary amines, such as, but not limited to, 1,4-diazabicylo[2.2.2]octane and 1,8-Diazabicyclo[5.4.0]undec-7-ene. Examples of pot-life-extending materials include, but are not limited to, 3-ethyl 2,4-pentanedione, pentanedione, and tertiary butyl acetoacetate.

The primer coating compositions of the present invention can be applied, with some embodiments, to a substrate by any appropriate art-recognized method. With some embodiments, the primer coating compositions can be applied by methods including, but not limited to: spray application; curtain coating; spin coating; and/or doctor blade application.

The primer coating compositions of the present invention can, with some embodiments, be applied in conjunction with one or more other coating compositions, such as, but not limited to, base coat compositions, and/or clear coating compositions (which are applied over the underlying primer coating layer, with some embodiments). The applied coating compositions, including the applied primer coating compositions of the present invention, with some embodiments, can be concurrently cured.

The primer coating compositions of the present invention, with some embodiments, can be cured, such as after application to a substrate, under ambient conditions. With some further embodiments, the primer coating compositions of the present invention can be cured, such as after application to a substrate, with concurrent exposure to elevated temperatures, such as, but not limited to, 30° C. to 60° C.

The primer coating compositions of the present invention can, with some embodiments, be applied so as to form single layer or multi-layer primer coatings that have cured film thicknesses of from 0.2 mils to 5 mils (5 µm to 127 µm).

The present invention also relates to a coated article that includes: (a) a substrate that includes a coated area including a first coating, and a repaired area, in which the repaired area resides within the coated area; (b) a primer layer residing within the repaired area, in which the primer layer is formed from the primer coating composition as described hereinabove; and (c) at least one second coating residing over the primer layer, in which the first coating and the second coating are substantially flush with each other.

For purposes of non-limiting illustration and with reference to The FIGURE, there is depicted a coated article 3 that includes a substrate 11, such as a metal substrate. The substrate 11 includes a coated area 14 that includes a first coating 17, and a repaired area 20. The repaired area 20, with some embodiments, resides within the coated area 14. The coated article further includes a primer layer 23 that resides within the repaired area 20. Primer layer 23 is formed from the primer coating composition of the present invention as describe previously herein. Primer layer 23, with some embodiments, is formed by application, such as spray application, of the primer coating composition of the present invention. The coated article 3 further includes at least one second coating 26 that resides over primer layer 23. First coating 17 and second coating 26 are substantially flush with each other. With some embodiments, the outermost layer 29 of the first coating 17 and the outermost layer 32 of the second coating 26 are substantially flush together and together form a substantially uniform surface.

With some embodiments the first coating 17 can include one or more layers. As depicted in The FIGURE, first coating 17 has four layers: an electrocoat deposited layer (or electrocoat layer) 35 residing over substrate 11; an original primer layer 38 residing over electrocoat layer 35; a first basecoat layer 41 residing over the original primer layer 38; and a first clearcoat layer 29 residing over the first basecoat layer 41.

The second coating 26, with some embodiments, can include one or more layers. As depicted in The FIGURE, second coating 26 has two layers: a second basecoat layer 44 residing over primer layer 23; and a second clearcoat layer 32 residing over the second basecoat layer 44. With some embodiments the second basecoat layer 44 and the second clearcoat layer 32 are each formed from art-recognized refinish coating compositions. Correspondingly, and with some embodiments, second coating 26 is a refinish coating.

With some embodiments, the first coating 17 is an original coating that resides on substrate 11, over the whole of coated area 14. Each layer of first coating 17 can, with some embodiments be formed form art-recognized original equipment coating compositions. Damage to a portion of first coating 17, such as a stone chip (not shown) that extends down through one or more layers thereof, can be repaired using the primer composition of the present invention. With some embodiments, the damaged area of first coating 17 is sanded in accordance with art-recognized methods at least down to the electrocoat layer 35. As depicted in The FIGURE, the damaged area of first coating 17 is sanded down to substrate 11. After cleaning the sanded area, such as with one or more solvents, the primer coating composition of the present invention is applied to the sanded area so as to form primer layer 23. Primer layer 23 can, with some embodiments be sanded, and the second basecoat layer 44 is applied over the sanded surface of primer layer 23, followed by application of the second clearcoat layer 32 over the second basecoat layer 44. Primer layer 23, second basecoat layer 44, and second clearcoat layer 32 can, with some embodiments, be concurrently cured under ambient conditions for a period time, such as 12 to 16 hours.

The coated article of the present invention, with some embodiments, is substantially free of visually observable ringing defects in the second coating. The coated article of the present invention, with some further embodiments, is free of visually observable ringing defects in the second coating. With some embodiments and with reference to The FIGURE, coated article 3 is substantially free of visually observable ringing defects in second coating 26. In some instances, ringing defects are manifested in the form of a visually observable line or ring of discoloration that appears to telegraph up through the topcoat layers, such as the basecoat and clearcoat layers of the repaired area. While not intending to be bound by any theory, it is believed that ringing defects are caused by and telegraph up from the refinish primer that resides within the repaired area. Coated articles that are prepared, such as repaired, using the primer coating compositions of the present invention are substantially free of visually observable ringing defects, with some embodiments. Coated articles that are prepared, such as repaired, using the primer coating compositions of the present invention are free of visually observable ringing defects, with some further embodiments.

The present invention is more particularly described in the following examples, which are intended to be illustrative only, since numerous modifications and variations therein will be apparent to those skilled in the art. Unless otherwise specified, all parts and percentages are by weight.

EXAMPLES

Synthesis Examples

Synthesis Example A

A hydroxyl functional acrylic polymer that can be used in the primer coating compositions of the present invention was prepared in accordance with the following description.

A reaction vessel equipped with a stirrer, thermocouple, condenser, and addition funnels equipped with pumps, was charged with 2357.1 grams (g) of toluene and heated to reflux (at a temperature of about 110° C.). Two feeds, identified as A and B, were next gradually added to the vessel over a period of three hours 35 minutes and three hours, respectively, while the contents of the vessel were maintained at reflux conditions. Feed A was composed of a mixture of 126.5 g LUPEROX DTA (di-tert-amyl peroxide, 97 percent solids by weight, obtained from Atochem) and 466.8 g toluene. Feed B was composed of a mixture of 1105.1 g methyl methacrylate, 804.3 g isobornyl methacrylate, 652.2 g hydroxyethyl methacrylate and 601.7 g n-butyl methacrylate. After the addition of the two feeds A and B was completed, the addition funnels were rinsed with 56.0 g each of toluene and the contents of the vessel are allowed to reflux for 1 hour. Thereafter, heating was discontinued, the contents of the vessel are allowed to cool, and 352.5 g toluene was added.

The product of the above reaction contained a film-forming hydroxyl functional acrylic polymer that had: a total solids content of 49.9 percent by weight (determined at 110° C. for 1 hour); a peak molecular weight of 9539, a weight average molecular weight (Mw) of 10,317, and a number average molecular weight (Mn) of 3170 (as determined by gel permeation chromatography utilizing a polystyrene standard); a Gardner-Holt viscosity of V; an acid value of 0.25; had a APHA color of 10; a weight/gallon of 8.19 pounds/gallon (0.98 Kg/liters); a hydroxyl value of 44.8; and a Tg of 76° C. (as determined using the Fox equation).

Synthesis Example B

A hydroxyl functional polyester that can be used in the primer coating compositions of the present invention was prepared in accordance with the following description.

A reaction vessel equipped with stirrer, thermocouple, condenser, and addition funnels equipped with pumps, was charged with 849.3 grams (g) of trimethylolpropane, 5919.5 g of epsilon-caprolactone, and 0.777 g of stannous octoate, and heated to 140° C. The temperature of the contents of the vessel was gradually increased to 175° C. and the consumption of epsilon-caprolactone was monitored by FTIR (peaks at 850 & 860 $cm^{-1}$). When the peaks were no longer observed, heating was discontinued and the contents of the vessel were allowed to cool.

The product of the above reaction had: a total solids content of 99.98 percent by weight (determined at 110° C. for 1 hour); a peak molecular weight of 1852, a weight average molecular weight (Mw) of 1912, and a number average molecular weight (Mn) of 1491 (as determined by gel permeation chromatography utilizing a polystyrene standard); a weight/gallon of 9.10 pounds/gallon (1.1 Kg/liter); and a hydroxyl value of 154.3 mg KOH/gram Primer Coating Composition Examples Example 1

A primer coating composition according to some embodiments of the present invention was prepared by mixing together a polyol package, an isocyanate package, and a reducer/solvent package, which were each separately prepared from the materials as summarized in the following Tables 1(a), 1(b), and 1(c).

TABLE 1(a)

| Polyol Package | |
|---|---|
| Material | Weight (grams) |
| Acrylic polyol of Synthesis Example A | 123.2 |
| Polyester polyol of Synthesis Example B | 5.71 |
| Methacryloxypropyltrimethoxy silane[1] | 2.91 |
| Polybutyl acrylate[2] | 0.35 |
| Dispersing aid[3] | 3.23 |
| Rheological additive[4] | 1.49 |
| Organophilic clay[5] | 1.16 |
| Parachlorobenzotrifluoride[6] | 26.95 |
| Methyl amyl ketone | 6.18 |
| Carbon black[7] | 0.58 |
| China clay[8] | 9.21 |
| Talc[9] | 31.1 |
| Calcium metasilicate[10] | 17.4 |
| Strontium aluminum polyphosphate[11] | 14.6 |
| Zinc-5-nitroisophthalate[12] | 1.8 |
| Barium sulfate[13] | 38.9 |
| Titanium dioxide[14] | 33.35 |
| Xylene | 1.83 |
| Methyl isobutyl ketone | 1.37 |
| Acetone | 1.53 |
| Dibutyl tin dilaurate[15] | 0.1 |
| Dibutyl tin diacetate[16] | 0.03 |

[1]SILQUEST A-174 methacryloxypropyltrimethoxy silane obtained from Momemtive Performance Materials.
[2]Obtained from BASF Corporation, having a resin solids of 60 wt %, based on total weight.
[3]DYSBYK 180 alkylolamonium salt of acid functional copolymer obtained from BYK-CHEMIE GmbH, having a resin solids of 100 wt. %.
[4]MPA 4020BA rheological additive obtained from Elementis Specialties, having a solids of 20 wt. %, based on total weight.
[5]BENTONE SD-2 organophilic clay obtained from Elementis Specialties.
[6]OXSOL 100 Parachlorobenzotrifluoride obtained from Shejiang Dongyang Weihua Chem Co.
[7]Carbon black obtained from Phelps Dodge.
[8]China clay obtained from BASF Catalysts LLC.
[9]Talc obtained from Barretts Minerals.
[10]10ES WWOLLASOCOAT calcium metasilicate obtained from NYCO Division.
[11]Heucophos SLPP strontium aluminum polyphosphate obtained from Heucotech.
[12]HEUCORIN RZ Zinc-5-nitroisophthalate obtained from Heucotech.
[13]BARIMITE 10 barium sulfate obtained from Cimbar Performance Minerals.
[14]TIONA 595 titanium dioxide obtained from Millennium Inorganic Chemicals.
[15]Dibutyl tin dilaurate obtained from Air Products & Chemicals.
[16]Dibutyl tin diacetate obtained from Air Products & Chemicals.

TABLE 1(b)

| Isocyanate Package | |
|---|---|
| Material | Weight (grams) |
| Butyl acetate | 12.18 |
| Xylene | 4.49 |
| Methyl isobutyl ketone | 10.74 |
| Hexamethylene isocyanurate[17] | 24.77 |

[17]DESMONDUR N3300A hexamethylene isocyanurate obtained from Bayer MaterialScience LLC, having a solids of 100 wt. %, based on total weight.

TABLE 1(c)

| Reducer Package | |
|---|---|
| Material | Weight (grams) |
| VM&P Naphtha[18] | 7.42 |
| Methyl ethyl ketone | 14.41 |
| Toluene | 8.09 |

TABLE 1(c)-continued

Reducer Package

| Material | Weight (grams) |
| --- | --- |
| Propylene glycol monomethyl ether acetate[19] | 9.99 |
| Lactol spirits[20] | 4.46 |

[18]VM&P naphtha obtained from Ashland Inc.

[19]PM ACETATE propylene glycol monomethyl ether acetate obtained from Eastman Chemical.

[20]Lactol spirits obtained from Ashland Inc.

Comparative Example 1

A comparative primer coating composition was prepared by mixing together a polyol package, an isocyanate package, and a reducer/solvent package, which were each separately prepared from the materials as summarized in the following Tables C1(a), C1(b), and C1(c). The primer coating composition of Comparative Example 1 included the acrylic polymer of Synthesis Example A, but did not include the polyester of Synthesis Example B.

TABLE C1(a)

Polyol Package

| Material | Weight (grams) |
| --- | --- |
| Acrylic polyol of Synthesis Example A | 131.28 |
| Methacryloxypropyltrimethoxy silane[1] | 3.1 |
| Polybutyl acrylate[2] | 0.34 |
| Dispersing aid[3] | 3.44 |
| Rheological additive[4] | 1.58 |
| Organophilic clay[5] | 1.23 |
| Parachlorobenzotrifluoride[6] | 28.71 |
| Methyl amyl ketone | 6.18 |
| Carbon black[7] | 0.62 |
| China clay[8] | 9.82 |
| Talc[9] | 33.04 |
| Calcium metalsilicate[10] | 18.55 |
| Strontium aluminum polyphosphate[11] | 15.56 |
| Zinc-5-nitroisophthalate[12] | 1.92 |
| Barium sulfate[13] | 41.46 |
| Titanium dioxide[14] | 35.53 |
| Xylene | 1.95 |
| Methyl isobutyl ketone | 1.46 |
| Acetone | 1.62 |
| Dibutyl tin dilaurate[15] | 0.11 |
| Dibutyl tin diacetate[16] | 0.04 |

TABLE C1(b)

Isocyanate Package

| Material | Weight (grams) |
| --- | --- |
| Butyl acetate | 12.75 |
| Xylene | 4.7 |
| Methyl isobutyl ketone | 11.25 |
| Hexamethylene isocyanurate[17] | 25.93 |

TABLE C1(c)

Reducer Package

| Material | Weight (grams) |
| --- | --- |
| VM&P Naphtha[18] | 7.77 |
| Methyl ethyl ketone | 15.08 |
| Toluene | 8.47 |
| Propylene glycol monomethyl ether acetate[19] | 10.46 |
| Lactol spirits[20] | 4.67 |

Comparative Example 2

A comparative primer coating composition was prepared by mixing together a polyol package, an isocyanate package, and a reducer/solvent package, which were each separately prepared from the materials as summarized in the following Tables C2(a), C2(b), and C2(c). The primer coating composition of Comparative Example 2 included a commercially available acrylic polyol and the polyester of Synthesis Example B.

TABLE C2(a)

Polyol Package

| Material | Weight (grams) |
| --- | --- |
| Acrylic polyol[21] | 50.88 |
| Polyester polyol of Synthesis Example B | 23.95 |
| Aliphatic polyester polyol[22] | 6.53 |
| Adhesion additive[23] | 1.50 |
| Methacryloxypropyltrimethoxy silane[1] | 5.37 |
| Dispersing aid[3] | 2.61 |
| Organophilic clay[5] | 0.98 |
| Parachlorobenzotrifluoride[6] | 16.07 |
| Carbon black[7] | 0.48 |
| Silica[24] | 1.72 |
| Talc[9] | 32.84 |
| Calcium metalsilicate[10] | 14.25 |
| Organic modified zinc aluminum[25] | 19.08 |
| Calcium carbonate | 18.07 |
| Barium sulfate[13] | 29.48 |
| Titanium dioxide[14] | 31.13 |
| Toluene | 8.93 |
| Methyl isobutyl ketone | 6.10 |
| Acetone | 3.91 |
| Cobalt drier[26] | 0.65 |
| Dibutyl tin dilaurate[15] | 0.11 |
| Dibutyl tin diacetate[16] | 0.05 |

[21]SETALUX 17-2319 acrylic polyol obtained from Nuplex Resins LLC.

[22]K-FLEX 188 polyester polyol obtained from king Industries, having a solids of 100 wt. %.

[23]TEGO AddBond LTW polyester adhesion additive obtained from Evonik Industries AG.

[24]AEROSILOK-412 silica obtained from Evonik Degussa GmbH.

[25]HEUCO PHOS ZAM organic modified zinc aluminum obtained from Heucotech.

[26]4% Ca Naphthanate cobalt drier obtained from OMG Chemical, having a solids of 54 wt. %, based on total weight.

TABLE C2(b)

Isocyanate Package

| Material | Weight (grams) |
| --- | --- |
| Isophorone isocyanurate[27] | 6.16 |
| Hexamethylene isocyanurate[17] | 24.37 |
| Parachlorobenzotrifluoride[6] | 7.95 |

[27]DESMONDUR Z447OBA isophorone isocyanurate obtained from Bayer MaterialScience LLC.

TABLE C2(c)

Reducer Package

| Material | Weight (grams) |
|---|---|
| Parachlorobenzotrifluoride[6] | 43.8 |

Comparative Example 3

A comparative primer coating composition was prepared by mixing together a polyol package, an isocyanate package, and a reducer/solvent package, which were each separately prepared from the materials as summarized in the following Tables C3(a), C3(b), and C3(c). The primer coating composition of Comparative Example 3 included a commercially available acrylic polyol and a commercially available polyester polyol.

TABLE C3(a)

Polyol Package

| Material | Weight (grams) |
|---|---|
| Acrylic polyol[21] | 48.27 |
| Polyester polyol[28] | 40.3 |
| Adhesion additive[23] | 1.42 |
| Methacryloxypropyltrimethoxy silane[1] | 5.09 |
| Dispersing aid[3] | 2.48 |
| Organophilic clay[5] | 0.93 |
| Parachlorobenzotrifluoride[6] | 15.24 |
| Carbon black[7] | 0.46 |
| Silica[29] | 1.05 |
| Talc[9] | 31.17 |
| Calcium metalsilicate[10] | 13.53 |
| Organic modified zinc aluminum[25] | 16.24 |
| Calcium carbonate | 17.13 |
| Barium sulfate[13] | 27.97 |
| Titanium dioxide[14] | 35.56 |
| Toluene | 3.71 |
| Methyl isobutyl ketone | 5.80 |
| Butyl acetate | 4.06 |
| Acetone | 3.71 |
| Cobalt drier[26] | 0.61 |
| Dibutyl tin dilaurate[15] | 0.10 |
| Dibutyl tin diacetate[16] | 0.05 |

[28]DESMOPHEN 670A-80 polyester polyol obtained from Bayer MaterialScience LLC.
[29]LOVEL 27 silica obtained from PPG Industries, Inc.

TABLE C3(b)

Isocyanate Package

| Material | Weight (grams) |
|---|---|
| Isophorone isocyanurate[27] | 6.22 |
| Hexamethylene isocyanurate[17] | 24.60 |
| Parachlorobenzotrifluoride[6] | 8.02 |

TABLE C3(c)

Reducer Package

| Material | Weight (grams) |
|---|---|
| Parachlorobenzotrifluoride[6] | 44.19 |

Evaluation of Primer Ringing

Basecoat/clearcoat test panels were prepared in accordance with the following description. The substrate panels, that were used to prepared the test panels, were steel panels having dimensions of 4 inches by 12 inches (10.2 cm×30.5 cm), which had thereon an ED6060CZ electrocoat primer layer (from PPG Industries, Inc.) and a HP78224EH primer sealer layer. The substrate panels (having the two coating layers thereon) were obtained from ACT Test Panels LLC. To each substrate panel was applied 0.12 to 0.14 mils (3.01 to 3.6 microns) of EVLD503Q color Ink Slate basecoat (commercially available from PPG Industries, Inc.). The applied basecoat was dried at 180° F. (82.2° C.) for 5 minutes then cooled to room temperature. Next, 1.8 to 2.0 mils (45.7 to 50.8 microns) of a clearcoat (prepared by combining together TKS1050AR clearcoat resin composition and TKS1050B clearcoat hardener composition, both commercially available from PPG Industries) was applied over the dried basecoat, and flash dried at ambient conditions for 5 to 10 minutes. The basecoat and clearcoat coated panels were then subjected to baking/curing at 260° F. (127° C.) for 30 minutes.

A center portion of each basecoat/clearcoat test panel was subjected to sanding using a dual action sander (DA sander) with 180 grit sand paper. The sanding exposed each layer down to the steel substrate forming concentric circles which resembled a "bulls-eye" target with each exposed layer being about 0.25 inches (6.35 mm) wide. The sanded basecoat/clearcoat test panels are referred to hereinafter as sanded test panels.

The sanded test panels were further sanded with a DA sander, first with 220 grit sand paper, and then 400 grit sand paper. The further sanded test panels were then cleaned with DX330 ACRYLI-CLEAN wax and grease remover (commercially available from PPG Industries, Inc.). The cleaned test panels were then coated with a refinish primer composition selected from Example 1 and Comparative Examples C1-C3, as described previously herein. The applied refinish primers each had a dry film thickness of about 4 to 5 mils (100 to 127 microns). The refinish primer coated test panels were allowed to dry for about one hour, followed by sanding with a DA sander using 400 grit paper to remove about 1 mil (25 microns) of the dried refinish primer, and then followed by additional sanding with a DA sander using 600 grit paper. The refinish primer coated and sanded panels were next coated, with a DELTRON DBC black basecoat (commercially available from PPG Industries, Inc.) having a dry film thickness of about 0.5 mils (12.5 microns), and then, wet-on-wet, with a DELTRON DC4000/DCH3070 clearcoat having a dry film thickness of about 2 to 3 mils (50 to 75 microns). The refinish repaired test panels were allowed to cure at ambient conditions overnight (for about 16 hours).

The refinish repaired test panels were stored flat (with the coated surfaces facing up and nothing laying thereon) at ambient conditions. The refinish repaired test panels were visually inspected at 1, 3, 7, and 14 days to determine if ringing defects were observed around the area of repair. The results with regard to such visual inspection at 14 days are summarized in the following Table A.

TABLE A

| Primer Coating Example | Result of Visual Inspection |
|---|---|
| Example 1 | No ringing defects observed. |
| Comparative Example 1 | Some ringing defects observed. |

TABLE A-continued

| Primer Coating Example | Result of Visual Inspection |
| --- | --- |
| Comparative Example 2 | Ringing defects observed. |
| Comparative Example 3 | Ringing defects observed. |

The results summarized in the above Table A demonstrate that primer coating compositions according to the present invention provide improved resistance with regard to the undesirable phenomenon of visually observable ringing defects relative to comparative primer coating compositions.

The present invention has been described with reference to specific details of particular embodiments thereof. It is not intended that such details be regarded as limitations upon the scope of the invention except insofar as and to the extent that they are included in the accompanying claims.

What is claimed is:

1. A primer coating composition comprising:
   (a) a (meth)acrylic polymer comprising hydroxyl groups, and having a Tg of at least 30° C.;
   (b) a polyester comprising hydroxyl groups, and having a weight average molecular weight of less than 3000, and a hydroxyl value of at least 100; and
   (c) a crosslinking agent having at least two isocyanate groups,
   wherein said polyester is present in said primer composition in an amount of greater than 0 percent by weight and less than or equal to 45 percent by weight, based on solids weight of said (meth)acrylic polymer and said polyester.

2. The primer coating composition of claim 1 wherein said (meth)acrylic polymer has a Tg of from 30° C. to 100° C.

3. The primer coating composition of claim 2 wherein said (meth)acrylic polymer has a Tg of from 40° C. to 90° C.

4. The primer coating composition of claim 1 wherein said (meth)acrylic polymer has a hydroxyl value of from 15 to 100, and a weight average molecular weight of from 5,000 to 25,000.

5. The primer coating composition of claim 1 wherein said (meth)acrylic polymer comprises residues of a high Tg (meth)acrylate monomer chosen from methyl methacrylate, ethyl methacrylate, iso-butyl methacrylate, sec-butyl methacrylate, t-butyl acrylate, t-butyl methacrylate, cyclohexyl methacrylate, isobornyl acrylate, isobornyl methacrylate, tetramethyl cyclohexyl methacrylate, and combinations thereof.

6. The primer coating composition of claim 5 wherein said (meth)acrylic polymer is substantially free of aromatic groups.

7. The primer coating composition of claim 1 wherein said polyester has a weight average molecular weight of from 500 to less than 3,000, and a hydroxyl value of from 100 to 300.

8. The primer coating composition of claim 7 wherein said polyester has a weight average molecular weight of from 800 to 2,000, and a hydroxyl value of from 120 to 250.

9. The primer coating composition of claim 1 wherein said polyester is an aliphatic polyester.

10. The primer coating composition of claim 9 wherein said polyester comprises residues of at least one polyol having at least two hydroxyl groups.

11. The primer coating composition of claim 10 wherein each polyol has at least three hydroxyl groups.

12. The primer coating composition of claim 11 wherein said polyester comprises residues of at least one cyclic carboxylic acid ester.

13. The primer coating composition of claim 9 wherein said polyester consists essentially of,
   residues of at least one polyol having three hydroxyl groups, and
   residues of at least one cyclic carboxylic acid ester.

14. The primer coating composition of claim 1 wherein said crosslinking agent comprises an aliphatic crosslinking agent.

15. The primer coating composition of claim 14 wherein said crosslinking agent comprises at least one isocyanurate adduct of an aliphatic diisocyanate.

16. The primer coating composition of claim 15 wherein said aliphatic diisocyanate is chosen from 1,4-tetramethylene diisocyanate, 1,6-hexamethylene diisocyanate, 1,4-cyclohexyl diisocyanate, isophorone diisocyanate, 4,4'-methylene-bis(cyclohexyl isocyanate), and combinations thereof.

17. The primer coating composition of claim 1 wherein said primer coating composition has an equivalent ratio of isocyanate groups to hydroxyl groups of from 0.5:1 to 1.8:1.

18. The primer coating composition of claim 1 wherein said primer coating composition has an equivalent ratio of isocyanate groups to hydroxyl groups of from 0.6:1 to 1.6:1.

19. The primer coating composition of claim 1 wherein said primer coating composition has an equivalent ratio of isocyanate groups to hydroxyl groups of from 0.8:1 to 1.3:1.

20. The primer coating composition of claim 1 wherein said primer coating composition comprises at least one pigment.

21. A coated article comprising:
   (a) a substrate comprising a coated area comprising a first coating, and a repaired area, wherein said repaired area resides within said coated area;
   (b) a primer layer residing within said repaired area, wherein said primer layer is formed from a primer coating composition comprising:
      (i) a (meth)acrylic polymer comprising hydroxyl groups, and having a Tg of at least 30° C.,
      (ii) a polyester comprising hydroxyl groups, and having a weight average molecular weight of less than 3000, and a hydroxyl value of at least 100, and
      (iii) a crosslinking agent having at least two isocyanate groups,
      wherein said polyester is present in said primer composition in an amount of greater than 0 percent by weight and less than or equal to 45 percent by weight, based on solids weight of said (meth)acrylic polymer and said polyester; and
   (c) at least one second coating residing over said primer layer, said first coating and said second coating being flush with each other.

22. The coated article of claim 21 wherein said coated article is free of visually observable ringing defects in said second coating.

* * * * *